(12) United States Patent
Erdl et al.

(10) Patent No.: US 9,964,271 B2
(45) Date of Patent: May 8, 2018

(54) ILLUMINATION DEVICE FOR A MOTOR VEHICLE AND CONVERSION LAYER FOR USE IN SAID TYPE OF ILLUMINATION DEVICE

(71) Applicant: Bayerische Motoren Werke Aktiengesellschaft, Munich (DE)

(72) Inventors: Helmut Erdl, Flintsbach (DE); Abdelmalek Hanafi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 261 days.

(21) Appl. No.: 14/527,929

(22) Filed: Oct. 30, 2014

(65) Prior Publication Data

US 2015/0055359 A1 Feb. 26, 2015

Related U.S. Application Data

(63) Continuation of application No. PCT/EP2013/059979, filed on May 15, 2013.

(30) Foreign Application Priority Data

May 22, 2012 (DE) .......................... 10 2012 208 566

(51) Int. Cl.
*F21V 11/00* (2015.01)
*F21S 8/10* (2006.01)
(Continued)

(52) U.S. Cl.
CPC ............ *F21S 48/1225* (2013.01); *F21K 9/64* (2016.08); *F21S 48/1159* (2013.01);
(Continued)

(58) Field of Classification Search
CPC ............... F21S 48/1225; F21S 48/1159; F21S 48/1757; F21V 9/16; F21Y 2115/30; F21Y 2101/00; G02B 26/105; F21K 9/64
(Continued)

(56) References Cited

U.S. PATENT DOCUMENTS

2006/0198118 A1 9/2006 Eichhorn et al.
2007/0014318 A1* 1/2007 Hajjar .................... B82Y 10/00
372/9
(Continued)

FOREIGN PATENT DOCUMENTS

CN 101283305 A 10/2008
CN 102080787 A 6/2011
(Continued)

OTHER PUBLICATIONS

WO2010067291A1 english language reference Van Bommel et al. Jun. 17, 2010.*
(Continued)

*Primary Examiner* — Elmito Breval
*Assistant Examiner* — Glenn Zimmerman
(74) *Attorney, Agent, or Firm* — Crowell & Moring LLP

(57) ABSTRACT

An illumination device for a motor vehicle includes a light source constructed of a number of semiconductor diodes which generate light in a first predetermined wavelength range, and a conversion layer on which a light beam generated from the light of the light source falls and by which the light beam is changed into a converted light beam. The light of the light beam is converted into a second predetermined wave length range by a converting material. The illumination device is designed such that a predetermined light distribution from the converted light beam is generated at a distance from the illumination device. The illumination device is characterized in that a structure hav- (Continued)

ing one or more walls with a predetermined depth in the direction of the thickness of the conversion layer is provided in at least one partial region of the surface of the conversion layer.

17 Claims, 2 Drawing Sheets

(51) Int. Cl.
| | | |
|---|---|---|
| *F21V 9/16* | (2006.01) | |
| *F21K 9/64* | (2016.01) | |
| *G02B 26/10* | (2006.01) | |
| *F21Y 115/30* | (2016.01) | |
| *F21Y 115/10* | (2016.01) | |

(52) U.S. Cl.
CPC ............ *F21S 48/1757* (2013.01); *F21V 9/16* (2013.01); *F21Y 2115/10* (2016.08); *F21Y 2115/30* (2016.08); *G02B 26/105* (2013.01)

(58) Field of Classification Search
USPC .................................................. 362/510, 543
See application file for complete search history.

(56) References Cited

U.S. PATENT DOCUMENTS

| | | | |
|---|---|---|---|
| 2007/0081336 A1 | 4/2007 | Bierhuizen et al. | |
| 2010/0090491 A1* | 4/2010 | Hipshier | B60R 7/04 296/24.34 |
| 2010/0201248 A1 | 8/2010 | Harada et al. | |
| 2010/0254019 A1* | 10/2010 | Cui | G01S 13/723 359/633 |
| 2011/0121731 A1 | 5/2011 | Tsutsumi et al. | |
| 2011/0174176 A1* | 7/2011 | Chun | H05K 9/0086 101/401.1 |
| 2011/0249460 A1 | 10/2011 | Kushimoto | |
| 2014/0029280 A1* | 1/2014 | Suckling | F21S 48/17 362/510 |

FOREIGN PATENT DOCUMENTS

| | | |
|---|---|---|
| DE | 103 15 133 A1 | 10/2004 |
| EP | 1 515 368 A2 | 3/2005 |
| EP | 2 233 828 A1 | 9/2010 |
| JP | 2013-26094 A | 2/2013 |
| WO | WO 2010/058323 A1 | 5/2010 |
| WO | WO 2010/067291 A1 | 6/2010 |

OTHER PUBLICATIONS

International Search Report (PCT/ISA/210) dated Jul. 24, 2013 with English translation (Six (6) pages).
German Search Report dated Jan. 25, 2013 with partial English translation (Ten (10) pages).
Chinese-language Office Action issued in counterpart Chinese Application No. 201380014235.X dated Jul. 18, 2016 with English translation (Eighteen (18) pages).
Chinese Office Action issued in counterpart Chinese Application No. 201380014235.X dated Dec. 21, 2015 with English-language translation (seventeen (17) pages).

* cited by examiner

ILLUMINATION DEVICE FOR A MOTOR VEHICLE AND CONVERSION LAYER FOR USE IN SAID TYPE OF ILLUMINATION DEVICE

CROSS REFERENCE TO RELATED APPLICATIONS

This application is a continuation of PCT International Application No. PCT/EP2013/059979, filed May 15, 2013, which claims priority under 35 U.S.C. § 119 from German Patent Application No. 10 2012 208 566.1, filed May 22, 2012, the entire disclosures of which are herein expressly incorporated by reference.

BACKGROUND AND SUMMARY OF THE INVENTION

The invention relates to an illumination device for a motor vehicle having a light source constructed of a number of semiconductor diodes which generate light in a first predetermined wavelength range, and a conversion layer on which a light beam generated from the light of the light source falls and by which the light beam is changed into a converted light beam, wherein the light of the light beam is converted into a second predetermined wave length range by a conversion material.

In order to generate light in a predetermined wavelength range, and in particular white light, with a motor vehicle illumination device, so-called conversion layers are used. The conversion layers include a suitable conversion material (such as for example phosphorus). For conversion of the light, a light beam generated by means of a light source is generally directed onto the conversion layer, so that a light beam is generated in a different wavelength range. In this case the problem exists that through scattering effects in the conversion layer a considerable widening of the light beam takes place, so that the definition of the light distribution generated with the illumination device is impaired.

The patent document WO 2010/058323 A1 describes an illumination device for a motor vehicle, in which the expansion of a color converted laser beam is delimited by use of a diaphragm on the conversion layer. In this case it is a disadvantage that the use of a diaphragm leads to a high loss of luminous flux (also called "luminous power") which is often not acceptable in vehicle lighting technology.

Therefore, the object of the invention is to create an illumination device for a motor vehicle in which the light is color converted by use of a conversion layer and which nevertheless ensures a high definition of the generated light distribution.

This and other objects are achieved according to the invention by an illumination device comprising a light source constructed of a number of semiconductor diodes (i.e. at least one semiconductor diode), which generate light in a first predetermined wavelength range. The generated light is preferably monochromatic and is, for example, in the blue or violet wavelength range (i.e. 450 nm or 405 nm). Thus, the expression "wavelength range" should be interpreted broadly and may, for example, also relate to a fixed wavelength. The illumination device comprises a conversion layer onto which a light beam generated from the light of the light source falls and by which the light beam is changed into a converted light beam, wherein the light of the light beam is converted into a second predetermined wave length range by a conversion material of the conversion layer. In a particularly preferred embodiment, the conversion layer is configured in such a way that the light is converted into white light.

The illumination device according to the invention is designed such that from the converted light beam a predetermined light distribution is generated at a distance from the illumination device and, in particular, in the far field of the illumination device. The far field is understood to be the light distribution at a distance from the illumination device which is substantially greater than the dimensions of the illumination device and is located, in particular, in the region of 25 m and optionally more ahead of the illumination device. A light beam is understood to be a bundle of light beams which is limited in angle and in space, wherein the light beams in the bundle may be substantially parallel or may also diverge or converge. The light beam may be produced by the light source itself or optionally also by one or more further optical devices.

The illumination device according to the invention is characterized in that in at least a part-region of the surface of the conversion layer (i.e. seen in plan view of the conversion), a structure of one or more walls with a predetermined depth in the direction of the thickness of the conversion layer is provided. With this structure a suitable delimitation of the light distribution can be achieved directly by the conversion layer. As a result a light distribution with high definition can be generated in the region of the structure.

In a particularly preferred embodiment, the structure is a grid structure composed of grid walls with a predetermined depth in the direction of the thickness of the conversion layer, i.e. the structure comprises a plurality of walls in the form of grid walls. In this case the grid structure forms a plurality of surface segments adjoining one another which each contain conversion material and are delimited by grid walls. Depending upon the application, the surface segments can be completely or optionally only partially filled with conversion material. By the conversion layer with the grid structure contained therein, via the surface segments, a light beam falling on the conversion layer can be suitably delimited in its extent, so that by comparison with a conversion layer without a grid structure, sharply defined light distributions with high definition can be generated.

In a particularly preferred embodiment, the wall or walls of at least a part of the structure and, in particular, the grid walls of at least a part of the grid structure and preferably the entire grid structure, are reflective, so that the light scattered in the conversion layer is concentrated in the corresponding surface segment. Thus, in contrast to the diaphragm technology, no losses in the light intensity occur. Depending upon the application, the wall or walls can have diffusely reflecting or also mirroring characteristics. Nevertheless, the possibility also exists for the wall or walls of at least a part of the structure to be light-absorbing.

In a further preferred embodiment, the wall or walls of at least a part of the structure and, in particular, the grid walls of at least a part of the grid structure, are formed of metallic material or have a metallic coating. Likewise, the wall or walls can be made of plastic material with or without a metallic coating.

Depending upon the application, the individual surface segments can have different shapes. In preferred embodiments the surface segments, when seen in plan view of the conversion layer, are polygons, in particular rectangles, squares, triangles, rhombuses and/or hexagons. In this way a particularly high filling factor of the grid is achieved within the conversion layer.

The three-dimensional measurements of the surface segments in a plan view can vary depending upon the desired definition of the light distribution generated by the illumination device. The maximum extent of a respective surface segment in a plan view of the conversion layer is preferably between 5 µm and 500 µm.

The wall thickness of the grid walls of the grid structure is preferably chosen to be very small by comparison with the extent of the surface segments, in order thereby to avoid dark zones in the generated light distribution. In particular, the wall thickness of the grid walls is 20% or less of the maximum extent of the surface segments in a plan view of the conversion layer.

The depth of the wall or walls and, in particular, of the grid walls, can vary depending upon the embodiment and preferably corresponds to the thickness of the conversion layer, but may optionally also be less or more. Preferably, the depth of the wall or walls is between 50 µm and 500 µm.

In a further preferred configuration, a straight boundary line, which in the predetermined light distribution constitutes at least a portion of a light-dark boundary, is formed by grid walls of a plurality of surface segments of the grid structure which adjoin one another. For example a sharp light-dark boundary in a low beam light distribution can be formed by a horizontally extending straight boundary line and an adjoining obliquely extending boundary line, as is explained further in the detailed description with reference to FIG. 2.

In a particularly preferred embodiment, a laser light source is used as a light source in the illumination device according to the invention. This means that the semiconductor diodes comprise one or more laser diodes and, in particular, comprise exclusively laser diodes. In this way a light distribution with very high light intensity can be generated. The laser diodes preferably have a respective maximum output of at least 1 W and, in particular, between 1.5 and 5 W.

Compositions which are known per se can be used as materials for the conversion layer. In a particularly preferred embodiment the conversion layer is a phosphorus conversion layer, which in particular comprises nitride phosphorus, oxide nitride phosphorus or cerium-doped YAG phosphorus. These materials are used in particular for conversion of a blue or violet light beam into white light.

In a further particularly preferred embodiment a scanner is provided between the light source and conversion layer. In operation, the scanner changes the position of the light beam and in this way moves a light spot produced by the light beam for generation of the predetermined light distribution. The scanner may be configured as a conventional line scanner which moves the light beam and thus the light spot line by line at a fixed frequency. In this case the light source can be switched on or off or varied in intensity for production of the predetermined light distribution.

Instead of a line scanner, in the device according to the invention, a so-called vector scanner can also be used by which the scanning speed at which the light spot moves, and/or the scan path along which the light spot is moved, can be varied and can be controlled by a corresponding control unit for generating the predetermined light distribution. The scan path corresponds to the pattern of movement of the light spot which is produced by the change of position of the light beam. By means of a corresponding definition of a scan path it is possible to delimit the region in which a predetermined light distribution is present. Furthermore, by passing a number of times through the same regions according to the defined scan path, the light intensity in these regions can be correspondingly increased.

In a further preferred embodiment of the invention, the illumination device comprises an optical device in the form of an exit optical system, which in the direction of the beam path of the light beam is provided downstream of the conversion layer and reproduces the converted light beam corresponding to the predetermined light distribution. The optical device can be formed by one or more lenses and/or one or more reflectors.

Depending upon the application, the illumination device according to the invention may take on different functionalities. In one embodiment the illumination device comprises a headlight. A headlight is characterized in that it actively illuminates the surroundings of the vehicle. The illumination device according to the invention may optionally also comprise a signal lamp which is characterized in that it merely serves to give signals to other road users.

In a preferred variant the illumination device is configured as a headlight in such a way that in operation a low (dipped) beam characteristic is generated as the predetermined light distribution. Optionally, the illumination device may also be configured in such a way that in operation it generates a high beam characteristic as the predetermined light distribution.

In a further embodiment of the illumination device according to the invention, the conversion material and/or the thickness of the conversion layer differs in at least a part of the surface segments from other surface segments. In this way a light distribution of different colors or color temperatures can be generated.

The invention further relates to a conversion layer for use in the illumination device described above or one or more preferred variants of the illumination device described above. The illumination device is configured in such a way that a light beam falling on the conversion layer is converted from light in a first predetermined wavelength range into a converted light beam, wherein the light of the light beam is converted into a second predetermined wavelength range by way of a conversion material. The conversion layer is characterized in that in at least a part-region and, in particular, in the entire surface of the conversion layer, a structure composed of one or more walls with a predetermined depth in the direction of the thickness of the conversion layer is provided. This structure is preferably a grid structure composed of a plurality of grid walls with a predetermined depth in the direction of the thickness of the conversion layer, wherein the grid structure forms a plurality of surface segments adjoining one another which each contain conversion material and are delimited by grid walls.

In addition to the illumination device according to the invention, the invention further relates to a motor vehicle which comprises one or more of the illumination devices according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
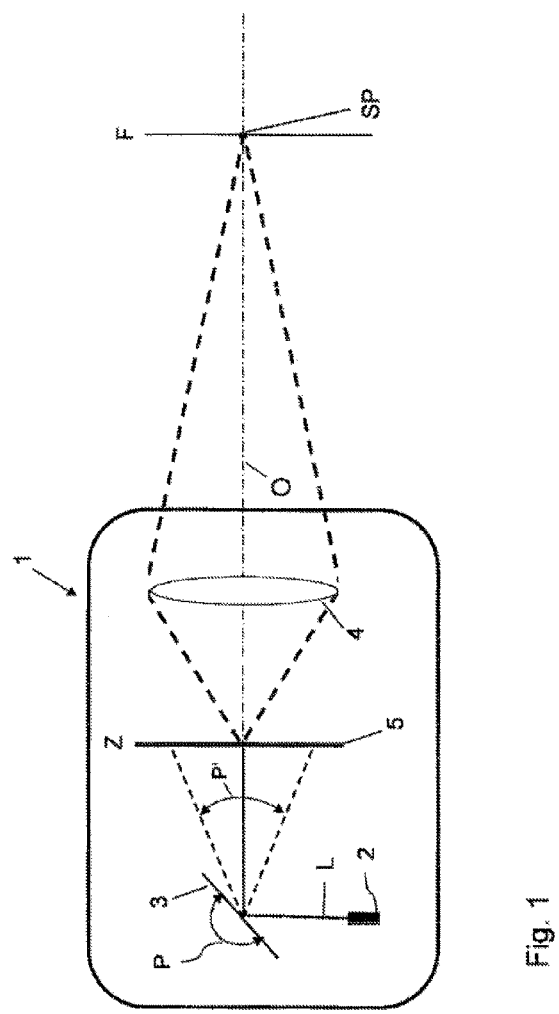
FIG. 1 is a schematic representation of an embodiment of an illumination device according to the invention.

FIG. 1 shows a side view of an illumination device 1 according to an embodiment of the invention, which here is a headlight installed in a motor vehicle (not shown). The illumination device 1 comprises a light source 2 in the form of a laser diode with optical attachment, by which a light beam L with high light density is generated. The light beam L falls onto a vector scanner 3, which is merely indicated schematically. The vector scanner 3 directs the light beam into a predetermined angular range by the pivoting of a suitable reflector element. The pivot range of the scanner in the plane of the drawing is indicated by the double arrow P and the corresponding pivot range of the light beam L is indicated by the double arrow P'. In addition to the pivoting in the plane of the drawing, by which the vertical position of the light beam is varied, the scanner can also be pivoted so that the position of the light beam can be changed horizontally.

The vector scanner 3 is controlled by a control unit (not shown), by which on the one hand the speed of movement of the light beam in the pivot range of the scanner and, on the other hand, also the movement path of the light beam can be suitably varied or set. As a result the vector scanner differs from line scanners which merely enable a constant, line by line movement of the light beam in a predetermined scan range. Any predetermined light distributions can be generated in a simple manner by the use of the vector scanner. Nevertheless, a line scanner can also be used instead of the vector scanner in the illumination device according to the invention. In this case, the light source for generating the predetermined light distribution is switched on and off or varied in power appropriately during the operation of the scanner.

By way of the laser light source 2 a monochromatic light beam is generated which, after passing through the scanner, is focused in the intermediate image plane Z and is converted there into white light. For this purpose a conversion layer with a grid integrated therein is located in the image plane Z. This conversion layer is described in greater detail below. A white light beam, which has its origin in a light surface or a light spot on the conversion layer, is generated by the conversion layer. By way of an exit optical system in the form of a lens 4 this light surface is converted into a light spot SP which changes its position in the far field F of the illumination device according to the movement of the light beam. FIG. 1 shows by broken lines the beam path for generation of the light spot SP in the event that the light beam L is located exactly on the optical axis O.

The desirable light distribution in the far field F is generated at a distance of approximately 25 m by corresponding adjustment or variation of the scanning speed or of the movement path of the light beam L. Depending upon the desired light distribution, the light spot SP is moved with a slower scanning speed in regions with high light intensity. Alternatively or additionally, the light spot can also often leave these regions. In contrast hereto, in regions with lower desired light intensity, the light spot is moved more quickly or is less frequently directed thereto.

The conversion layer 5 of the illumination device of the FIG. 1 comprises a conversion material which converts the monochromatic laser light into white light. In the embodiment described here a suitable phosphorus material is used for this purpose. Because of scattering effects within the conversion layer, in conventional conversion layers the problem exists that due to the conversion layer a considerable widening of the light beam takes place, so that a large light surface is generated on the conversion layer This, in turn, reduces the definition of the light distribution generated in the far field. As a result, the production of a very high-contrast light distribution, for example with sharp light-dark boundaries, is made difficult.

Figure 2:
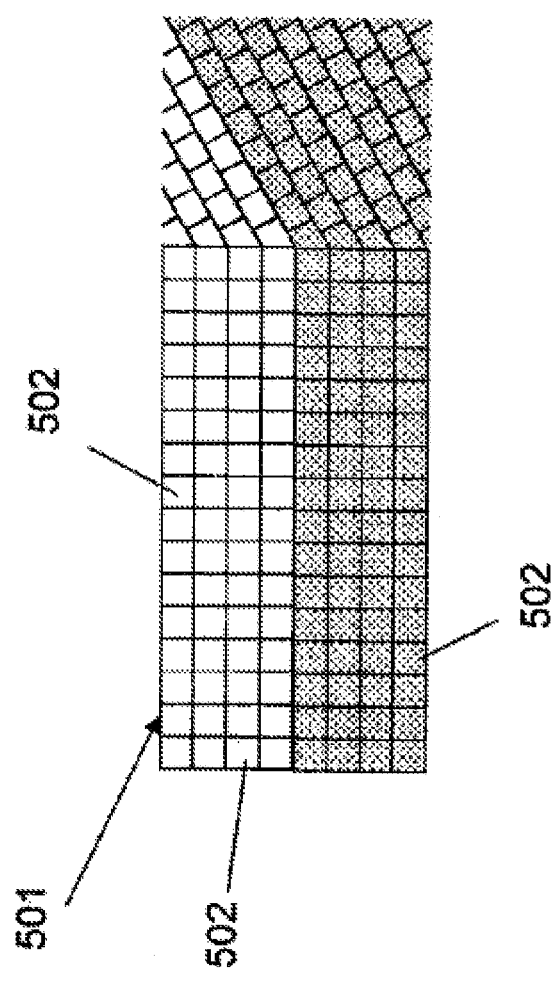
FIG. 2 shows a plan view of a conversion layer of the illumination device of FIG. 1.

In order to solve this problem, the conversion layer 5 of the illumination device of FIG. 1 contains a grid structure which can be seen from FIG. 2. FIG. 2 shows a plan view of the conversion layer 5, which has the form of a rectangle with a size for example of 5 cm×10 cm. It will be recognized that the rectangular conversion layer contains a grid structure 501 formed of thin struts which have a predetermined depth in the direction perpendicular to the plane of the drawing. The depth of the struts is preferably in the range of the thickness of the conversion layer, which is generally between 50 µm and 500 µm. Thus, the grid structure 501 consists of a plurality of grid walls, which in the embodiment of FIG. 2 form surface segments 502 which adjoin one another, are predominantly square, and which for reasons of clarity are only designated in part by this reference sign. Depending upon the required definition of the light distribution, the size of the individual square surface segments can be selected appropriately. In a preferred embodiment, the squares have an edge length between 5 µm and 500 µm. The thickness of the walls of the grid structure is substantially smaller than the dimensions of the square. Metal (for example aluminum) or plastic with a metallic coating can be used in particular as materials for the grid walls.

In the plan view in FIG. 2 the square surface segments extend initially from left to right in the horizontal direction and then bend obliquely upwards, wherein this configuration corresponds to a low (dipped) beam characteristic which can be generated by the illumination device. According to FIG. 2, the surface segments in the lower half of the conversion layer are shown dotted, thereby indicating that in the generation of the light distribution the light beam is moved by means of the vector scanner 3 in such a way that only the dotted squares are illuminated. In this way a sharp light-dark boundary is formed in the dipped beam light distribution. Thus, the dotted region of the grid structure corresponds in its shape to the light distribution generated on the road by the illumination device, i.e. the light distribution consists of correspondingly depicted square light spots SP in the far field. Depending upon the exit optical system used, the light distribution may be upside down relative to the grid structure. In this case, the grid structure according to FIG. 2 is rotated by 180° in the sheet plane. For illumination by the light beam, the square surface segments 502 lead to a limitation of the light beam, so that a widening of the light beam is counteracted and the light distribution can be generated with very high definition and correspondingly high contrast on the road. The formation of the sharp light-dark boundary assisted by the fact that the configuration of the upper edges of the squares corresponds to the configuration of the light-dark boundary.

In order to avoid a loss of light intensity through the grid structure 501, the grid in the embodiment of FIG. 2 is reflective, so that light scattered by the conversion material is concentrated in the corresponding square surface segment. Nevertheless there is optionally also the possibility of using a non-reflective material for the grid structure, which leads to curtailing of the light surface generated on the conversion layer.

The grid structure illustrated in FIG. 2 is merely by way of example, and variations of this grid structure are possible. In particular, the individual surface segments may also be configured as different types of polygons, such as for example rhombuses, triangles, hexagons and the like. Likewise, the grid may also be irregular, i.e. the size of the individual surface segments or squares may vary, so that the definition of the light distribution can be changed in different regions.

As can be seen from the above statements, by the conversion layer with grid structure 501 shown in FIG. 2, pixel-like light spots of defined size are generated on the conversion layer, and are then reproduced in a corresponding light distribution on the road. The definition of the optical system is determined by the fineness of the surface segments. The wall thickness of the grid structure is very thin in comparison with the size of the surface segments, so that no dark zone is produced between two adjacent pixels generated on the conversion layer. By the use of a conversion layer with a grid structure integrated therein, extremely high contrasts are produced between adjacent light spots in the light distribution. In particular, sharp light-dark boundaries can be generated, such as was explained with reference to FIG. 2 for a low beam light distribution.

LIST OF REFERENCE SIGNS 1 illumination device
2 light source
3 scanner
4 lens
5 conversion layer
501 grid structure
502 surface segment
L light beam
P, P' arrows
Z intermediate image plane
F far field
SP light spot
O optical axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An illumination device for a motor vehicle, comprising:
   a light source constructed of a number of semiconductor diodes generating light in a first predetermined wavelength range;
   a conversion layer arranged in a path of a light beam generated from the light of the light source, the conversion layer changing the light beam into a converted light beam in which the light of the light beam is converted into a second predetermined wavelength range via a conversion material of the conversion layer; and
   a grid structure having one or more grid walls, the grid structure being provided in at least one partial region of a surface of the conversion layer, the grid structure forming a plurality of surface segments adjoining one another, each surface segment containing the conversion material and being delimited by the grid walls, the grid walls having a predetermined depth in a direction of the thickness of the conversion layer and a predetermined thickness that is less than the surface area dimensions of each segment,
   wherein the illumination device is configured to generate the predetermined light distribution at a distance from the illumination device from the converted light beam, and
   wherein a straight boundary line forming at least a portion of a light-dark boundary in the predetermined light distribution is formed by the grid walls.

2. The illumination device according to claim 1, wherein the grid walls of at least a part of the grid structure are formed to be diffusely reflecting and/or mirroring.

3. The illumination device according to claim 1, wherein the grid walls of at least a part of the grid structure are light-absorbing.

4. The illumination device according to claim 1, wherein the grid walls of at least a part of the grid structure are formed of a metallic material or have a metallic coating.

5. The illumination device according to claim 1, wherein at least some of the plurality of surface segments, viewed in a plan view of the conversion layer, have a polygonal shape.

6. The illumination device according to claim 1, wherein a maximum extent of a respective surface segment, viewed in a plan view of the conversion layer, is between 5 μm and 500 μm.

7. The illumination device according to claim 1, wherein the number of semiconductor diodes comprises one or more laser diodes.

8. The illumination device according to claim 1, wherein the number of semiconductor diodes generate monochromatic light, the light beam of which falls on the conversion layer.

9. The illumination device according to claim 1, wherein the conversion layer is a phosphorous conversion layer.

10. The illumination device according to claim 1, wherein the conversion material and/or the thickness of the conversion layer differs at least in part of the surface segments from other surface segments.

11. The illumination device according to claim 5, wherein the polygonal shape comprises a shape of a rectangle, square, triangle, rhombus, and/or hexagon.

12. The illumination device according to claim 6, wherein a wall thickness of the grid walls of the grid structure is 20% less than the maximum extent of the respective surface segment.

13. The illumination device according to claim 8, wherein the conversion material converts the monochromatic light of the light beam into the converted light beam composed of white light.

14. The illumination device according to claim 9, wherein the phosphorous conversion layer comprises one of nitride phosphorous, oxide nitride phosphorous, or cerium-doped YAG phosphorous.

15. The illumination device according to claim 12, wherein a depth of the grid walls is between 50 μm and 500 μm.

16. A component for use in an illumination device for a motor vehicle, the illumination device having a light source constructed of a number of semiconductor diodes that generate light in a first predetermined wavelength range, the component comprising:
   a conversion layer that converts light in a first predetermined wavelength range of a light beam that falls on the conversion layer into a converted light beam wherein the light of the light beam is converted to a second predetermined wavelength range; and
   a grid structure having one or more grid walls, the grid structure being provided in at least a partial region of a surface of the conversion layer, the grid structure forming a plurality of surface segments joining one another, each surface segment containing the conversion material for converting the light and being delimited by the grid walls, the grid walls having a predetermined depth in a direction of the thickness of the conversion layer and a predetermined thickness that is less than the surface area dimensions of each segment, wherein a straight boundary line forming at least a portion of a light-dark boundary in the predetermined light distribution is formed by the grid walls.

17. A motor vehicle, comprising:

one or more illumination devices, each illumination device comprising:

a light source constructed of a number of semiconductor diodes generating light in a first predetermined wavelength range;

a conversion layer arranged in a path of a light beam generated from the light of the light source, the conversion layer changing the light beam into a converted light beam in which light of the light beam is converted into a second predetermined wavelength range via a conversion material of the conversion layer; and a grid structure having one or more grid walls, the grid structure being provided in at least one partial region of a surface of the conversion layer, the grid structure forming a plurality of surface segments joining one another, each surface segment containing the conversion material and being delimited by the grid walls, the grid walls having a predetermined depth in a direction of the thickness of the conversion layer and a predetermined thickness that is less than the surface area dimensions of each segment, wherein the illumination device is configured to generate the predetermined light distribution at a distance from the illumination device from the converted light beam, and wherein a straight boundary line forming at least a portion of a light-dark boundary in the predetermined light distribution is formed by the grid walls.

* * * * *